United States Patent
Kim

(10) Patent No.: US 9,251,957 B2
(45) Date of Patent: Feb. 2, 2016

(54) MULTILAYER CERAMIC CONDENSER AND METHOD OF MANUFACTURING THE SAME

(75) Inventor: Hyung Joon Kim, Gyunggi-do (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/194,366

(22) Filed: Jul. 29, 2011

(65) Prior Publication Data

US 2012/0154978 A1    Jun. 21, 2012

(30) Foreign Application Priority Data

Dec. 15, 2010    (KR) .................. 10-2010-0128304

(51) Int. Cl.
| | |
|---|---|
| H01G 4/06 | (2006.01) |
| H01G 4/00 | (2006.01) |
| H01G 4/30 | (2006.01) |
| H01G 4/12 | (2006.01) |
| H01G 4/012 | (2006.01) |
| H01G 4/248 | (2006.01) |

(52) U.S. Cl.
CPC .............. *H01G 4/30* (2013.01); *H01G 4/012* (2013.01); *H01G 4/12* (2013.01); *H01G 4/1209* (2013.01); *H01G 4/248* (2013.01); *Y10T 29/43* (2015.01)

(58) Field of Classification Search
CPC ..... H01G 4/30; H01G 4/1227; H01G 4/0085; H01L 28/55
USPC .......................... 361/321.1, 321.2, 311, 301.4
See application file for complete search history.

(56) References Cited

U.S. PATENT DOCUMENTS

| | | | | |
|---|---|---|---|---|
| 4,771,520 | A * | 9/1988 | Tanaka et al. ................ | 29/25.42 |
| 7,089,659 | B2 * | 8/2006 | Iwaida et al. ................ | 29/830 |
| 7,644,480 | B2 * | 1/2010 | Kim et al. .................... | 29/25.42 |

(Continued)

FOREIGN PATENT DOCUMENTS

| | | |
|---|---|---|
| JP | 9-97733 C | 5/1980 |
| JP | 61-248413 A | 11/1986 |

(Continued)

OTHER PUBLICATIONS

Korean Office Action, w/ English translation thereof, issued in Korean Patent Application No. 10-2010-0128304, dated Feb. 2, 2012.

(Continued)

*Primary Examiner* — David M Sinclair
*Assistant Examiner* — Arun Ramaswamy
(74) *Attorney, Agent, or Firm* — McDermott Will & Emery LLP

(57) ABSTRACT

A multilayer ceramic condenser includes a multilayer main body, a first outer electrode, a second outer electrode, a first side part and a second side part. The multilayer main body has a first side, a second side, a third side and a fourth side. The multilayer main body includes a plurality of inner electrodes and a dielectric layer between the inner electrodes. The dielectric layer is formed by a first ceramic dielectric powder. The first side part and the second side part are formed on the second side and the fourth side of the multilayer main body, and formed by a second ceramic dielectric powder having a smaller particle diameter than the first ceramic dielectric powder. A mean grain size of the first side part or the second side part is similar to or smaller than that of the dielectric layer of the multilayer main body.

11 Claims, 3 Drawing Sheets

(56) References Cited

U.S. PATENT DOCUMENTS

| | | |
|---|---|---|
| 2003/0016484 A1 | 1/2003 | Iwaida et al. |
| 2007/0251066 A1 | 11/2007 | Kim et al. |
| 2010/0067171 A1* | 3/2010 | Yamazaki et al. ......... 361/321.4 |
| 2010/0085682 A1 | 4/2010 | Abe et al. |

FOREIGN PATENT DOCUMENTS

| | | |
|---|---|---|
| JP | 03-108306 A | 5/1991 |
| JP | 2004-221268 A | 8/2004 |
| JP | 2006-237237 A | 9/2006 |
| JP | 2009-032833 | 2/2009 |
| JP | 2010-092896 A | 4/2010 |
| KR | 10-2009-0061556 A | 6/2009 |

OTHER PUBLICATIONS

Japanese Office Action, and English translation thereof, issued in Japanese Patent Application No. 2011-164059 mailed Oct. 2, 2012.

Office Action issued in corresponding Chinese Patent Application No. 201110246715.1 dated Feb. 28, 2014.

Chinese Office Action dated Nov. 2, 2014 issued in Chinese Patent Application No. 201110246715.1 (English translation).

Non-final U.S. Office Action dated Jun. 15, 2015 issued in copending U.S. Appl. No. 14/633,034.

* cited by examiner

MULTILAYER CERAMIC CONDENSER AND METHOD OF MANUFACTURING THE SAME

CROSS-REFERENCE TO RELATED APPLICATIONS

This application claims the priority of Korean Patent Application No. 10-2010-0128304 filed on Dec. 15, 2010, in the Korean Intellectual Property Office, the disclosure of which is incorporated herein by reference.

BACKGROUND OF THE INVENTION

1. Field of the Invention

The present invention relates to a multilayer ceramic condenser and a method of manufacturing the same, and more particularly, to a method of manufacturing a multilayer ceramic condenser having improved reliability by resisting residual stress, and a multilayer ceramic condenser manufactured thereby.

2. Description of the Related Art

A condenser, a device capable of storing electricity, stores electricity in each electrode by applying voltage to opposing electrodes. When DC voltage is applied to the condenser; however current flows in the condenser while electricity is stored therein, but when the storage of electricity is completed, current does not flow in the condenser. Meanwhile, when AC voltage is applied to the condenser, AC current continuously flows in the condenser while the polarity of the electrodes is alternated.

Depending on the type of an insulator provided between electrodes, the condenser may be classified as one of an aluminum electrolytic condenser, in which electrodes are made of aluminum and a thin oxide layer is provided between the aluminum electrodes, a tantalum electrolytic condenser using tantalum as an electrode material, a ceramic condenser using a high-K dielectric such as barium titanate between electrodes, a multi layer ceramic condenser (MLCC) using a multilayer structure made of a high-K ceramic as a dielectric provided between electrodes, a film condenser using a polystyrene film as a dielectric between electrodes, or the like.

Among these, the multilayer ceramic condenser may be miniaturized while having excellent heat resistance and frequency characteristics, such that it has been commonly used for various applications, such as a high frequency circuit, or the like.

In the multilayer ceramic condenser according to the related art, a laminate may be formed by stacking a plurality of dielectric sheets, external electrodes having different polarities may be formed on the outside of the laminate, and inner electrodes, alternately stacked within the laminate, may be electrically connected to respective outer electrodes.

The inner electrodes alternately formed between the dielectric sheets are opposed and paired with one another such that polarity exists therebetween to generate capacitance coupling, such that the multilayer ceramic condenser has a capacitance value.

Recently, as electronic products have become miniaturized and highly integrated, research into miniaturizing and highly integrating the multilayer ceramic condenser has been conducted. In particular, various attempts at thinning and highly stacking the dielectric layers in order to implement the high capacity and miniaturization of the multilayer ceramic condenser and optimizing a margin portion of a multilayer main body in order to secure an overlap area of an inner electrode have been conducted.

SUMMARY OF THE INVENTION

An aspect of the present invention provides a method of manufacturing a multilayer ceramic condenser having improved reliability by resisting residual stress between a multilayer main body and side parts in a multilayer ceramic condenser, and a multilayer ceramic condenser manufactured thereby.

According to an aspect of the present invention, there is provided a multilayer ceramic condenser, including a multilayer main body, a first outer electrode, a second outer electrode, a first side part and a second side part. The multilayer main body has a first side, a second side, a third side and a fourth side. The multilayer main body includes a plurality of inner electrodes and a dielectric layer between the inner electrodes. The plurality of inner electrodes ate exposed to the second side and the fourth side. The dielectric layer is formed by a first ceramic dielectric powder. The first outer electrode and the second outer electrode are formed on the first side and the third side of the multilayer main body. The first side part and the second side part are formed on the second side and the fourth side of the multilayer main body. The first side part and the second side part are formed by a second ceramic dielectric powder having a smaller particle diameter than the first ceramic dielectric powder.

A particle diameter D90 of the accumulated weight 90% of an accumulated particle size distribution of the first ceramic dielectric powder may be 50 to 300 nm.

A particle diameter D90 of an accumulated weight 90% of an accumulated particle size distribution of the second ceramic dielectric powder may be 20 to 300 nm.

A Brunauer-Emmett-Teller ("BET") specific surface area of the second ceramic dielectric powder may be set to be larger by 1 to 50 $m^2/g$ than that of the first ceramic dielectric powder.

The multilayer main body may further include a first cover layer and a second cover layer formed on a top surface and a bottom surface thereof. The first cover layer and the second cover layer may be formed by a third ceramic dielectric powder.

A particle diameter of the third ceramic dielectric powder may be similar to that of the first ceramic dielectric powder.

A sintering temperature of the of dielectric layer and the first and second side parts may be 800 to 1200° C.

A sintering temperature of the first cover layer and the second cover layer may be 800 to 1200° C.

A particle diameter D90 of an accumulated weight 90% of an accumulated particle size distribution of ceramic grains of the dielectric layers layer and the first and second side parts are sintered may be 20 to 100 nm.

A size of a ceramic grain grown from the first ceramic dielectric powders may be similar to that of a ceramic grain grown from the second ceramic dielectric powders.

A mean grain size of ceramic grains grown from the first ceramic dielectric powders may be similar to or smaller than that of ceramic grains grown from the second ceramic dielectric powders.

According to another aspect of the present invention, there is provided a multilayer ceramic condenser, including a multilayer main body, a first outer electrode, a second outer electrode, a first side part and a second side part. The multilayer main body has a first side, a second side, a third side and a fourth side. The multilayer main body includes a plurality of inner electrodes and a dielectric layer between the inner electrodes. The plurality of inner electrodes ate exposed to the second side and the fourth side. The dielectric layer is formed by a first ceramic dielectric powder. The first outer electrode and the second outer electrode are formed on the first side and the third side of the multilayer main body. The first side part and the second side part are formed on the second side and the fourth side of the multilayer main body. A mean grain size of the first side part or the second side part is similar to or smaller than that of the dielectric layer of the multilayer main body.

According to an aspect of the present invention, there is provided a method of manufacturing a multilayer ceramic condenser, including: forming a plurality of ceramic green sheets using ceramic slurry including a ceramic dielectric powder, an organic binder, and an organic solvent; printing a first inner electrode pattern or a second inner electrode pattern on the ceramic green sheets; forming a multilayer main body sequentially including a first side, a second side, a third side, and a fourth side by stacking the plurality of ceramic green sheets to alternately stack a first inner electrode pattern and a second inner electrode pattern; and forming a first side part and a second side part by applying a second ceramic slurry including a second ceramic dielectric powder having a smaller particle diameter than that of the first ceramic dielectric powder, an organic binder and an organic solvent to the respective second and fourth sides.

The method of manufacturing a multilayer ceramic condenser may further include: respectively forming a first cover layer and a second cover layer formed on the top surface and the bottom surface of the plurality of dielectric layers and including a third ceramic dielectric powder having a particle diameter similar to that of the first ceramic dielectric powder.

The particle diameter D90 of the accumulated weight 90% of the accumulated particle size distribution of the first ceramic dielectric powder may be 50 to 30 nm.

The particle diameter D90 of the accumulated weight 90% of the accumulated particle size distribution of the second ceramic dielectric powder may be 20 to 30 nm.

A BET specific surface area of the second ceramic dielectric powder may be set to be larger by 1 to 50 $m^2/g$ than that of the first ceramic dielectric powder.

The sintering temperature of the plurality of dielectric layers and the first and second side parts may be 800 to 1200° C.

The particle diameter D90 of the accumulated weight 90% of the accumulated particle size distribution of ceramic grains after the plurality of dielectric layers and the first and second side parts are sintered may be 20 to 100 nm.

The method of manufacturing a multilayer ceramic condenser may further include forming a first outer electrode and a second outer electrode respectively connected to a first inner electrode pattern exposed to the first side and a second inner electrode pattern exposed to the third side.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will be described with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Hereinafter, a multilayer ceramic condenser and a method of manufacturing the same according to an exemplary embodiment of the present invention will be described with reference to FIGS. 1 to 3.

Figure 1:
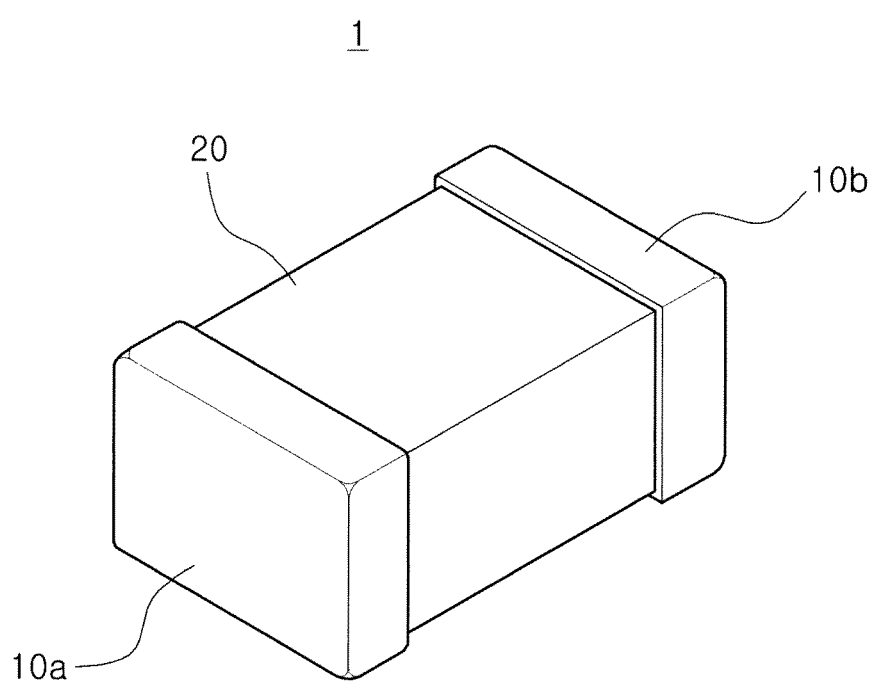
FIG. 1 is a perspective view of a multilayer ceramic condenser according to an exemplary embodiment of the present invention.
Figure 2:
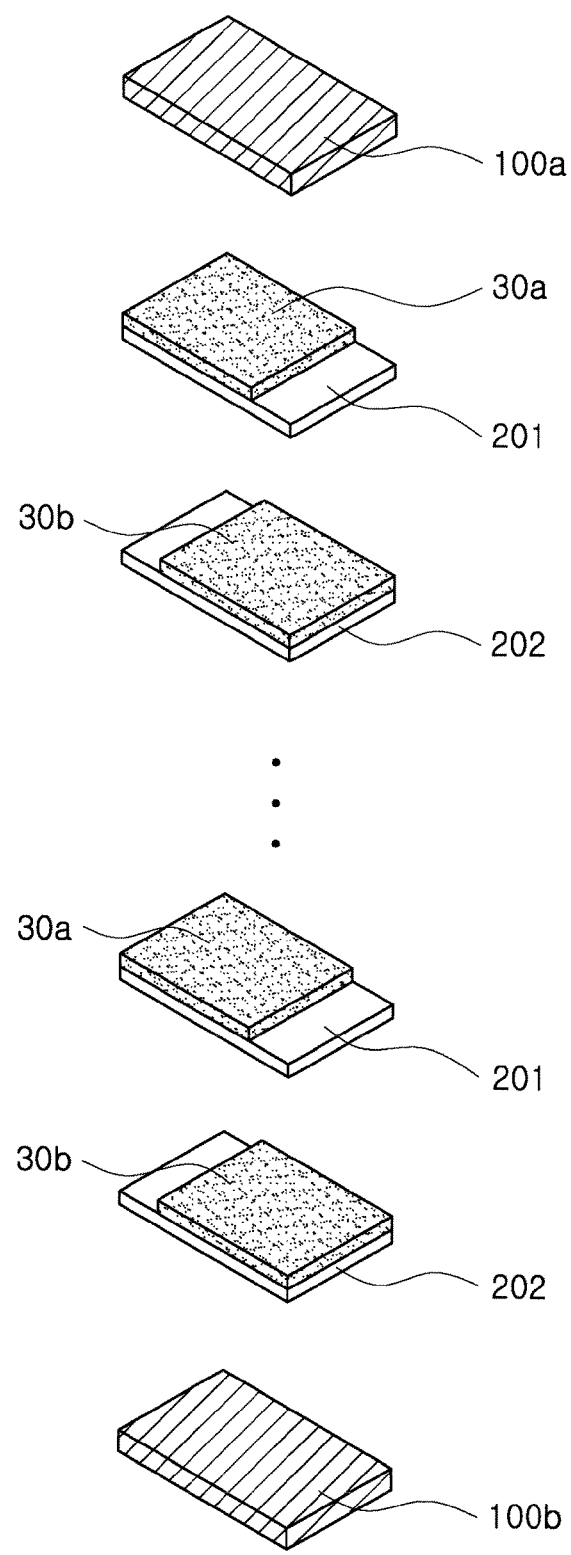
FIG. 2 is an exploded perspective view showing a multilayer main body according to an exemplary embodiment of the present invention.
Figure 3:
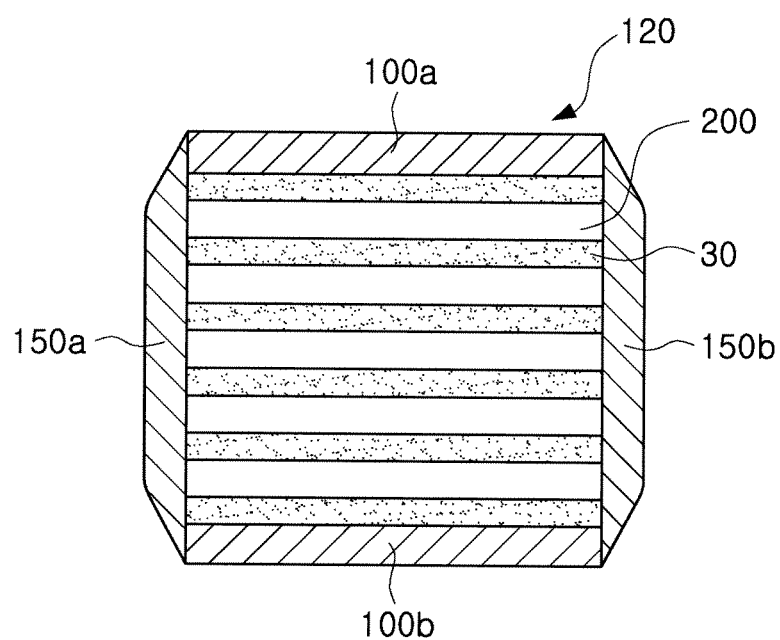
FIG. 3 is a cross-sectional view taken along direction A-A' of the multilayer ceramic condenser of FIG. 1.

FIG. 1 is a perspective view of a multilayer ceramic condenser according to an exemplary embodiment of the present invention, FIG. 2 is an exploded perspective view showing a multilayer main body according to an exemplary embodiment of the present invention, and FIG. 3 is a cross-sectional view taken along direction A-A' of the multilayer ceramic condenser of FIG. 1.

Referring to FIG. 1, a multilayer ceramic condenser according to an exemplary embodiment of the present invention may be configured to include a multilayer main body 20 and a first outer electrode 10a and a second outer electrode 10b formed at both ends of the multilayer main body 20.

The multilayer main body 20 is formed by stacking a plurality of dielectric layers 200 and includes a first side, a second side, a third side, and a fourth side. The first side and the third side are formed to face each other and the second side and the fourth side are also formed to face each other.

The multilayer main body 20 may include a plurality of dielectric layers 200 and first inner electrode patterns 30a and second inner electrode patterns 30b formed between the plurality of dielectric layers 200 to be exposed to the first side and the third side. The first inner electrode pattern 30a and the second inner electrode pattern 30b are alternately stacked, having at least one dielectric layer 200 disposed therebetween.

The first inner electrode pattern 30a and the second inner electrode pattern 30b are formed to be exposed to the first side and the third side, respectively, and the first side and the third side are individually provided with the first outer electrode 10a and the second outer electrode 10b, such that the first inner electrode pattern 30a or the second inner electrode pattern 30b may respectively be electrically connected to the first outer electrode 10a and the second outer electrode 10b.

The plurality of dielectric layers 200 forming the multilayer main body 20 may be formed of a high-k ceramic green sheet, which is in turn subjected to a stacking process and a firing process to form the multilayer main body 20 having the plurality of stacked dielectric layers 200.

The first outer electrode 10a and the second outer electrode 10b may be made of materials having excellent electrical conductivity, and may serve to electrically connect the first inner electrode pattern 30a, the second inner electrode pattern 30b, or other various patterns formed in the multilayer ceramic condenser to external devices.

The first outer electrode 10a and the second outer electrode 10b are not limited thereto, but may be made of materials having excellent electrical conductivity such as Ni, Ag, Pd, or the like.

According to the exemplary embodiment of the present invention, a margin portion may be formed on the side of the multilayer main body to secure the durability of the multilayer main body and improve the reliability of chips.

The multilayer main body may be formed by manufacturing a first ceramic slurry including a first ceramic dielectric powder, an organic binder, and an organic solvent, manufacturing a plurality of ceramic green sheets by applying the first ceramic slurry to a substrate, and stacking the manufactured ceramic green sheets.

Meanwhile, in order to form the margin portion, a method of manufacturing a second ceramic slurry including a second ceramic dielectric powder, an organic binder, and an organic solvent and dipping the multilayer main body in the second ceramic slurry may be used.

In this case, the ceramic slurry forming the margin portion needs to have appropriate strength and densification so as to be simultaneously fired to that of the ceramic slurry forming the ceramic green sheets that is configured as the multilayer main body.

However, when the first ceramic dielectric powder and the second ceramic dielectric powder have an approximately equal particle diameter, the intervals between particles are densified by the stacking and compressing processes in the first ceramic dielectric powder to relatively lower the sintering temperature, thereby causing the phenomenon that the sintering temperature of the multilayer main body including the first ceramic dielectric powder is lower.

Therefore, when the margin portion is formed in the multilayer main body and a simultaneous firing process is applied thereto, the margin portion is non-fired in order to generate the residual stress between the margin portion and the multilayer main body, thereby causing cracks.

However, according to the exemplary embodiment of the present invention, the particle diameter of the second ceramic dielectric powder forming the margin portion is different from the particle diameter of the first ceramic dielectric powder, such that simultaneous sintering may be achieved.

Further, the sintering characteristics may be more improved by forming a first side part and a second side part on only the second side and the fourth side without forming the margin portion over the entire surface of the multilayer main body and by optimizing the thicknesses of the side parts thereof.

As the multilayer main body and the margin portion are fired simultaneously, residual stress occurs between the multilayer main body and the margin portion, thereby preventing cracks from being formed therein.

Hereinafter, a method of manufacturing a multilayer ceramic condenser according to an exemplary embodiment of the present invention will be described with reference to FIGS. 2 to 3.

A method of manufacturing a multilayer ceramic condenser according to an exemplary embodiment of the present invention includes: forming a plurality of ceramic green sheets using ceramic slurry including a first ceramic dielectric powder, an organic binder, and an organic solvent; printing a first inner electrode pattern 30a or a second inner electrode pattern 30b on the ceramic green sheets; forming a multilayer main body 20 sequentially including a first side, a second side, a third side, and a fourth side by stacking the plurality of ceramic green sheets to alternately stack the first inner electrode pattern 30a and the second inner electrode pattern 30b; and forming the first side part 150a and the second side part 150b by covering the respective second and fourth sides with a second ceramic slurry including a second ceramic dielectric powder having a smaller particle diameter than that of the first ceramic dielectric powder, an organic binder and an organic solvent.

Referring to FIG. 2 showing the multilayer ceramic condenser according to the exemplary embodiment of the present invention, a plurality of ceramic green sheets 201 and 202 are prepared in order to manufacture the multilayer ceramic condenser according to the exemplary embodiment of the present invention.

The plurality of ceramic green sheets 201 and 202 may be formed by applying the first ceramic slurry including the first ceramic dielectric powder, the organic binder, and the organic solvent to the substrate as a carrier film.

The first ceramic dielectric powder may be made of a high-K material. It is not limited but a barium titanate-based material, a lead complex Perovskite-based material, a strontium titanate-based material, or the like, may be used, preferably, a barium titanate powder may be used.

The organic binder for securing the dispersibility and viscosity of the ultra fine ceramic dielectric powder may be used to control the viscosity of the ceramic slurry by controlling the amount thereof. A resin may be used as the organic binder and is not limited, but a resin such as ethyl cellulose, polyvinyl butyral, or the like, may be used.

The first inner electrode pattern 30a and the second inner electrode pattern 30b exposed to different surfaces may be printed on the plurality of ceramic green sheets 201 and 202.

Therefore, the plurality of first ceramic green sheets 201 printed with the first inner electrode pattern 30a may be manufactured, and the plurality of second ceramic green sheets 202 printed with the second inner electrode pattern 30b may be manufactured.

The plurality of first ceramic green sheets 201 and the plurality of second ceramic green sheets 202 are alternately stacked to form the multilayer main body 20. The multilayer main body 20 includes the first side, the second side, the third side, and the fourth side.

The first inner electrode pattern 30a may be formed to be exposed to the first side of the multilayer main body 20 and the second inner electrode pattern 30b may be formed to be exposed to the third side of the multilayer main body 20.

The first inner electrode pattern 30a and the second inner electrode pattern 30b may be made of a conductive metal having excellent electrical conductivity, and it is not limited but the first inner electrode pattern 30a and the second inner electrode pattern 30b may include at least one selected from a group consisting of Ag, Ni, Cu, Pd, and an alloy thereof.

According to the exemplary embodiment of the present invention, the multilayer main body 20 may include a first cover layer 100a stacked on the uppermost surface thereof and a second cover layer 100b stacked on the lowest surface thereof.

The first cover layer 100a and the second cover layer 100b are respectively stacked on the uppermost surface and the lowest surface of the multilayer main body 20 to protect the plurality of first ceramic green sheets and the plurality of second ceramic green sheets stacked in the multilayer main body 20 from a physical and chemical stress from the outside.

The first cover layer 100a and the second cover layer 100b may be formed by applying a third ceramic slurry including a third ceramic dielectric powder, an organic binder, and an organic solvent to the substrate such as the carrier film.

The third ceramic dielectric powder may have a particle diameter similar to that of the first ceramic dielectric powder.

In order to simultaneously fire the plurality of first ceramic green sheets 201, the plurality of second ceramic green sheets 202, the first cover layer 100a and the second cover layer 100b in firing the multilayer main body 20, the third ceramic dielectric powder may be manufactured to have an approximately equal particle diameter to that of the first ceramic dielectric powder.

According to the exemplary embodiment of the present invention, the multilayer main body 20 may be formed by stacking and compressing the plurality of dielectric layers 200 including the first ceramic dielectric powder and the first and second cover layers 100a and 100b including the third ceramic dielectric powder, wherein the first ceramic dielectric powder and the third ceramic dielectric powder have a similar particle size and thus, may be simultaneously fired.

In addition, in the multilayer main body 20 according to the exemplary embodiment of the present invention, the inner electrode patterns are provided to cover the overall area other than a minimum area of the plurality of dielectric layers 200 required to maintain the insulation of the plurality of dielectric layers, such that the inner electrode patterns can secure a maximum area in the multilayer main body 20 in order to secure capacitance within the multilayer ceramic condenser.

In the case of the multilayer ceramic condenser, the capacitance of the multilayer ceramic condenser may be secured according to an overlap area of the first inner electrode pattern 30a and the second inner electrode pattern 30b. According to the exemplary embodiment of the present invention, the overlap area of the first inner electrode pattern 30a and the second inner electrode pattern 30b may be substantially increased. Therefore, the high-capacity multilayer ceramic condenser may be implemented.

According to the exemplary embodiment of the present invention, the second side and the third side of the multilayer main body 20 may respectively be provided with a first side part 150a and a second side part 150b.

The first inner electrode pattern 30a and the second inner electrode pattern 30b are respectively formed to be exposed to the first side and the third side and to cover the dielectric layer 200, such that both the first and second inner electrode patterns 30a and 30b may be exposed to all of the first side, the second side, the third side, and the fourth side.

Therefore, when the first and second inner electrode patterns 30a and 30b are manufactured in a chip form, these electrode patterns may be exposed to the outside, such that they are damaged by the physical and chemical stress, thereby causing defects to the first and second inner electrode patterns 30a and 30b.

The top surface and the bottom surface of the multilayer main body 20 are provided with the first cover layer 100a and the second cover layer 100b, such that the first and second inner electrode patterns 30a and 30b can be protected. Further, the first side and the third side of the multilayer main body 20 are provided with the first outer electrode and the second outer electrode, such that the first and second inner electrode patterns 30a and 30b formed therein can be protected.

In the related art, when the first and second inner electrode patterns are printed in the dielectric layer, the first and second inner electrode patterns are not exposed to the second side and the fourth side. Therefore, the first and second inner electrode patterns can be protected from the external stress without forming a separate margin.

However, according to the exemplary embodiment of the present invention, the first and second inner electrode patterns are printed to cover the dielectric layers 200, such that the first and second inner electrode patterns 30a and 30b are exposed to the second side and the fourth side.

According to the exemplary embodiment of the present invention, the second side and the fourth side may respectively be provided with the first side part 150a and the second side part 150b.

The first side part 150a and the second side part 150b are formed by selectively applying the slurry to only the second side and the fourth side and thus, the thickness of the first cover layer 100a and the second cover layer 100b may not be affected.

The exemplary embodiment of the present invention may use a method of selectively applying a slurry to only the second side and the fourth side. That is, it is not limited but the first side part 150a and the second side part 150b may be formed by applying the slurry to only the second side and the fourth side by using the method that films are removably attached to all of the surfaces of the multilayer main body 20 other than the second side and the fourth side thereof, and then, dip in the slurry and the attached films are removed.

The first side part 150a and the second side part 150b may be formed to be covered with the second ceramic slurry. The second ceramic slurry may include a second ceramic dielectric powder, an organic binder, and an organic solvent.

The organic binder and the organic solvent may be used to disperse the second ceramic dielectric powder in the second ceramic slurry. In particular, as the organic binder, a resin such as ethyl cellulose, polyvinyl butyral, or the like, may be used, but is not limited thereto.

The second ceramic dielectric powder may be made of the same material as the first ceramic dielectric powder, as a high-K material. The material used for the second ceramic dielectric powder may be a lead complex Perovskite-based material, a strontium titanate-based material, or the like, preferably, may be a barium titanate powder, but is not limited thereto.

According to the exemplary embodiment of the present invention, the particle diameter of the second ceramic dielectric powder may be set to be smaller than that of the first ceramic dielectric powder.

When the particle diameter of the first ceramic dielectric powder is similar to that of the second ceramic dielectric powder, the dielectric layer including the first ceramic dielectric powder is sintered at a lower temperature than that of the first and second side parts including the second ceramic dielectric powder.

The dielectric layer has the densification of the ceramic dielectric powder by the stacking and compressing processes, such that the dielectric layer may be sintered at a relatively lower temperature.

When the dielectric layer is different from the first and second side parts in terms of the sintering temperature, the first and second side parts are non-sintered during a simultaneous firing process after the first and second side parts are formed in the multilayer main body 20.

Therefore, the residual stress may occur between the dielectric layer and the first and second side parts, such that the cracks or the deformation may occur between the dielectric layer and the first and second side parts.

According to the exemplary embodiment of the present invention, the particle diameter of the second ceramic dielectric powder may be smaller than that of the first ceramic dielectric powder in order to match the sintering temperature of the dielectric layer 200 with that of the side parts.

The particle diameter D90 of the accumulated weight 90% of the accumulated particle size distribution of the first ceramic dielectric powder may be 50 to 300 nm. The particle diameter D90 of the accumulated weight 90% of the accumulated particle size distribution of the second ceramic dielectric powder may be 20 to 300 nm.

In more detail, a Brunauer-Emmett-Teller ("BET") specific surface area of the second ceramic dielectric powder may be set to be larger by 1 to 50 $m^2/g$ than that of the first ceramic dielectric powder.

When a difference between the BET specific surface areas of the second ceramic dielectric powder and the first ceramic dielectric powder is below 1 $m^2/g$, the first and second side parts may be non-sintered.

In addition, when the difference between the BET specific surface areas of the second ceramic dielectric powder and the first ceramic dielectric powder exceeds 50 $m^2/g$, the contraction ratio of the first and second side parts becomes excessively large during a firing process, such that the cracks or the deformation may occur due to the difference of the contraction ratios between the dielectric layer and the first and second side parts.

In particular, the phenomenon that the inner electrode of the multilayer main body is diffused to the outer electrode during the firing process may occur. In this case, when the first and second parts are excessively contracted, the cracks may occur by the diffusion force of the inner electrode between the first and second side parts and the multilayer main body and the contraction force affecting the first and second side parts.

Therefore, the difference between the BET specific surface areas of the second ceramic dielectric powder and the first ceramic dielectric powder may be 1 to 50 $m^2/g$.

According to the exemplary embodiment of the present invention, the sintering temperature of the plurality of dielectric layers 200 including the first ceramic dielectric powder may be similar to that of the first and second side parts 150a and 150b including the second ceramic dielectric powder.

According to the exemplary embodiment of the present invention, the sintering temperature of the plurality of dielectric layers 200 and the first side part 150a and the second side part 150b may be 800 to 1200° C.

The sintering temperature of the plurality of dielectric layers 200 may be similar to that of the first and second side parts 150a and 150b, such that the multilayer main body 20 and the first and second side parts 150a and 150b may be simultaneously fired. Therefore, the phenomenon that the multilayer main body 20 and the first and second parts 150a and 150b are partially fired during the firing process may be prevented.

According to the exemplary embodiment of the present invention, the multilayer main body 20 includes the plurality of dielectric layers 200 and the first cover layer 100a and the second cover layer 100b respectively formed on the top surface and the bottom surface of the dielectric layer 200. The first and second cover layers 100a and 100b include the third ceramic dielectric powder having a particle diameter similar to a particle diameter of the first ceramic dielectric powder included in the plurality of dielectric layers 200.

Therefore, the plurality of dielectric layers 200 and the first and second cover layers 100a and 100b may be sintered at an approximately equal temperature, such that the sintering temperature of the first and second cover layers 100a and 100b may be 800 to 1200° C.

When the multilayer main body 20 and the first and second side parts 150a and 150b are sintered, the organic binder and the organic solvent included therein may be completely evaporated and the ceramic powders are densified to grow to ceramic grains.

According to the exemplary embodiment of the present invention, the grain diameter D90 of the accumulated weight 90% of the accumulated grain size distribution of the ceramic grains after sintering the first ceramic dielectric powder forming the dielectric layer 200 and the second ceramic dielectric powder forming the first and second side parts 150a and 150b may be 20 to 1000 nm.

According to the exemplary embodiment of the present invention, the particle diameter of the second ceramic dielectric powder is smaller than that of the first ceramic dielectric powder or the BET specific surface area of the second ceramic dielectric powder is larger than that of the first ceramic dielectric powder. Accordingly, a mean grain size of the first and second side parts 150a and 150b may be similar to or smaller than that of the dielectric layer 200. The mean grain size of the first and second side parts 150a and 150b may be controlled by controlling the size or the BET specific surface area of the second ceramic dielectric powder. In one embodiment of the present invention, the mean grain size of the first and second side parts 150a and 150b may be smaller than that of the dielectric layer 200. In another embodiment of the present invention, the mean grain size of the first and second side parts 150a and 150b may be similar to that of the dielectric layer 200.

In one exemplary embodiment of the present invention, since the first ceramic dielectric powder forming the dielectric layer 200 and the third ceramic dielectric powder forming the first and second cover layers 100a and 100b are appropriately densified by the stacking and compressing processes, the mean grain size of the first and second side parts 150a and 150b may be similar to that of the dielectric layer 200. In particular, when the difference between the BET specific surface areas of the first ceramic dielectric powder and the second ceramic dielectric powder is 1 to 50 $m^2/g$, the mean grain size of the first and second side parts 150a and 150b may be similar to that of the dielectric layer 200.

That is, according to the exemplary embodiment of the present invention, the grain size of the first and second side parts 150a and 150b may be controlled by controlling the particle size or the BET specific surface area of the second ceramic dielectric powder, such that the occurrence of the residual stress between the multilayer main body 20 and the first and second side parts 150a and 150b may be prevented.

Consequently, it is possible to prevent the cracks and the deformation of the multilayer main body 20 and the first and second side parts 150a and 150b from occurring by resisting the residual stress during the sintering process of the multilayer main body 20 and the first and second side parts 150a and 150b. Further, the multilayer main body 20 and the first and second side parts 150a and 150b may be integrated in the completed multilayer ceramic condenser, such that the durability of the multilayer ceramic condenser is increased.

Referring to FIGS. 1 and 3, the multilayer ceramic condenser according to the exemplary embodiment of the present invention may be configured to include: the multilayer main body 20 in which the plurality of dielectric layers 200 formed by applying the first ceramic slurry including the first ceramic dielectric powder, the organic binder, and the organic solvent are stacked and sequentially surrounded by the first side, the second side, the third side, and the fourth side; the first inner electrode pattern 30a and the second inner electrode pattern 30b formed between the plurality of dielectric layers 200 and formed to be exposed to the first side and the third side opposing to each other in the multilayer main body 20; and the first side part 150a and the second side part 150b respectively formed on the second side and the fourth side of the multilayer main body 20, and formed by applying the second ceramic slurry including the second ceramic dielectric powder having a smaller particle diameter than the first ceramic dielectric powder, the organic binder, and the organic solvent thereto.

According to the exemplary embodiment of the present invention, in order to match the sintering temperature of the plurality of dielectric layers 200 including the first ceramic dielectric powder with that of the first and second side parts 150a and 150b including the second ceramic dielectric powder, the particle diameter of the second ceramic dielectric powder may be smaller than that of the first ceramic dielectric powder.

In more detail, the particle diameter D90 of the accumulated weight 90% of the accumulated particle size distribution of the first ceramic dielectric powder may be 50 to 300 nm. The particle diameter D90 of the accumulated weight 90% of the accumulated particle size distribution of the second ceramic dielectric powder may be 20 to 300 nm.

In other words, the BET specific surface area of the second ceramic dielectric powder may be set to be larger by 1 to 50 $m^2/g$ than that of the first ceramic dielectric powder.

Therefore, the plurality of dielectric layers 200 and the first and second side parts 150a and 150b that are subjected to the stacking and compressing processes may be simultaneously fired, and the occurrence of the residual stress between the plurality of dielectric layers 200 and the first and second side parts 150a and 150b during the firing process may be prevented.

According to the exemplary embodiment of the present invention, the first cover layer 100a and the second cover layer 100b stacked on the top surface and the bottom surface of the plurality of dielectric layers 200 and including the third ceramic dielectric powder may be provided.

Therefore, the plurality of dielectric layer 200 may be protected from the external stress.

The first and second cover layers 100a and 100b may have an particle diameter similar to that of the first ceramic dielectric powder. The first and second cover layers 100a and 100b and the plurality of dielectric layers 200 are subjected to the stacking and compressing processes, such that they may have an approximately equal sintering temperature even though they include the third ceramic dielectric powder having a particle diameter similar to that of the first ceramic dielectric powder.

According to the exemplary embodiment of the present invention, the sintering temperature of the plurality of dielectric layers 200 and the first side part 150a and the second side part 150a and 150b may be 800 to 1200° C.

Further, the sintering temperature of the first cover layer 100a and the second cover layer 100b may be 800 to 1200° C.

According to the exemplary embodiment of the present invention, the first ceramic dielectric powder and the second ceramic dielectric powder are selected to have an appropriate size, such that they may have an approximately equal sintering temperature. As a result, the non-sintered components are not present even though the plurality of dielectric layers 200 and the first and second side parts 150a and 150b are simultaneously fired.

According to the exemplary embodiment of the present invention, after the organic binder and the organic solvent are removed by the firing process, the ceramic slurries are grown to ceramic grains having an approximately equal size.

After the plurality of dielectric layers 200 and the first side part 150a and the second side part 150b are sintered, the particle diameter D90 of the accumulated weight 90% of the accumulated particle size distribution of the ceramic grains may be 20 to 1000 nm.

According to the exemplary embodiment of the present invention, even though the particle diameter of the first ceramic dielectric powder is larger than that of the second ceramic dielectric powder, the first ceramic dielectric powders are densified by the stacking and compressing processes, such that the ceramic grains grown from the first ceramic dielectric powders after being subjected to the firing process have the size similar to that of the ceramic grains grown from the second ceramic dielectric powders.

Therefore, the plurality of dielectric layers 200 configured as the multilayer main body 20, the first and second cover layers 100a and 100b, and the first and second side parts 150a and 150b attached to the multilayer main body 20 may be integrated, such that they have a relatively strong durability against the external stress involved in use.

According to the exemplary embodiment of the present invention, the inner electrode patterns capable of securing maximum overlap areas can be printed in the plurality of dielectric layers 200. Therefore, the high-capacity multilayer ceramic condenser can be implemented.

According to the exemplary embodiment of the present invention, the first and second side parts 150a and 150b having a sintering temperature similar to that of the multilayer main body 20 are formed in the multilayer main body 20, such that the first and second side parts 150a and 150b can be sintered simultaneously to the multilayer main body 20. Therefore, it is possible to prevent the cracks and deformation of the products by resisting the residual stress in the multilayer main body 20 and the first and second side parts 150a and 150b during the firing process.

In addition, according to the exemplary embodiment of the present invention, a mean grain size of the first and second side parts 150a and 150b may be controlled by controlling the particle size or the BET specific surface area of the second ceramic dielectric powder. The mean grain size of the first and second side parts 150a and 150b may be similar to or smaller than that of the dielectric layer 200. In particular, when the mean grain size of the first and second side parts 150a and 150b is similar to that of the multilayer main body 20, the multilayer main body 20 and the first and second side parts 150a and 150b can be integrated, such that the durability of the multilayer ceramic condenser can be secured.

As set forth above, according to the exemplary embodiment of the present invention, the residual stress between the multilayer main body 20 in which the plurality of dielectric layers 200 of the multilayer ceramic condenser are stacked and the side parts 150a and 150b formed on the sides of the multilayer main body 20 may be prevented.

Therefore, according to the exemplary embodiment of the present invention, cracks between the side parts 150a and 150b and the multilayer main body 20 or the deformation of chips during the firing process may be prevented. Accordingly, the multilayer ceramic condenser having the improved reliability may be manufactured.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic condenser, comprising:
   a multilayer main body having a first side, a second side, a third side and a fourth side, the multilayer main body including:
      a plurality of inner electrodes exposed to the second side and the fourth side; and
      a dielectric layer between the inner electrodes, the dielectric layer being formed by a first ceramic dielectric powder;
   a first outer electrode and a second outer electrode formed on the first side and the third side of the multilayer main body; and
   a first side part and a second side part formed on the second side and the fourth side of the multilayer main body covering the dielectric layer of the main body, the first side part and the second side part being formed by a second ceramic dielectric powder having a smaller mean particle diameter than that of the first ceramic dielectric powder, wherein a Brunauer-Emmett-Teller ("BET") specific surface area of the second ceramic dielectric powder is set to be larger by 1 to 50 $m^2/g$ than that of the first ceramic dielectric powder.

2. The multilayer ceramic condenser of claim 1, wherein a particle diameter D90 of an accumulated weight 90% of an accumulated particle size distribution of the first ceramic dielectric powder is 50 to 300 nm.

3. The multilayer ceramic condenser of claim 1, wherein a particle diameter D90 of an accumulated weight 90% of an accumulated particle size distribution of the second ceramic dielectric powder is 20 to 300 nm.

4. The multilayer ceramic condenser of claim 1, wherein the multilayer main body further includes a first cover layer and a second cover layer formed on a top surface and a bottom surface thereof, the first cover layer and the second cover layer being formed by a third ceramic dielectric powder.

5. The multilayer ceramic condenser of claim 4, wherein a particle diameter of the third ceramic dielectric powder is similar to that of the first ceramic dielectric powder.

6. The multilayer ceramic condenser of claim 1, wherein a sintering temperature of the dielectric layer and the first and second side parts is 800 to 1200° C.

7. The multilayer ceramic condenser of claim 4, wherein a sintering temperature of the first cover layer and the second cover layer is 800 to 1200° C.

8. The multilayer ceramic condenser of claim 1, wherein a particle diameter D90 of an accumulated weight 90% of an accumulated particle size distribution of ceramic grains of the dielectric layer and the first and second side parts is 20 to 1000 nm.

9. The multilayer ceramic condenser of claim 1, wherein a size of a ceramic grain grown from the first ceramic dielectric powders is similar to that of a ceramic grain grown from the second ceramic dielectric powders.

10. The multilayer ceramic condenser of claim 1, wherein a mean grain size of ceramic grains grown from the first ceramic dielectric powders is similar to or smaller than that of ceramic grains grown from the second ceramic dielectric powders.

11. A multilayer ceramic condenser, comprising:

a multilayer main body having a first side, a second side, a third side and a fourth side, the multilayer main body including:
  a plurality of inner electrodes exposed to the second side and the fourth side; and
  a dielectric layer between the inner electrodes, the dielectric layer being formed by a first ceramic dielectric powder;

a first outer electrode and a second outer electrode formed on the first side and the third side of the multilayer main body; and a first side part and a second side part formed on the second side and the fourth side of the multilayer main body covering the dielectric layer of the main body, a mean grain size of the first side part or the second side part being smaller than that of the dielectric layer of the multilayer main body, wherein a Brunauer-Emmett-Teller ("BET") specific surface area of the second ceramic dielectric powder is set to be larger by 1 to 50 $m^2/g$ than that of the first ceramic dielectric powder.

* * * * *